US011528419B2

(12) United States Patent
Seo et al.

(10) Patent No.: US 11,528,419 B2
(45) Date of Patent: Dec. 13, 2022

(54) CAMERA MODULE

(71) Applicant: Samsung Electro-Mechanics Co., Ltd., Suwon-si (KR)

(72) Inventors: Bo Sung Seo, Suwon-si (KR); Young Bok Yoon, Suwon-si (KR); Young Hwan Kwon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 78 days.

(21) Appl. No.: 17/098,655

(22) Filed: Nov. 16, 2020

(65) Prior Publication Data

US 2021/0377448 A1 Dec. 2, 2021

(30) Foreign Application Priority Data

May 28, 2020 (KR) .......................... 10-2020-0064078

(51) Int. Cl.
*H04N 5/232* (2006.01)
*G02B 13/00* (2006.01)
*H04N 5/225* (2006.01)

(52) U.S. Cl.
CPC ..... *H04N 5/23287* (2013.01); *G02B 13/0015* (2013.01); *H04N 5/2252* (2013.01); *H04N 5/23283* (2013.01); *G03B 2205/0069* (2013.01)

(58) Field of Classification Search
CPC ................................................ G02B 13/0015
See application file for complete search history.

(56) References Cited

U.S. PATENT DOCUMENTS

2010/0097498 A1\* 4/2010 Zaifrani ............... H04N 5/2254
                                                          348/240.99
2018/0109660 A1 4/2018 Yoon et al.
2018/0364450 A1\* 12/2018 Lee .................... H04N 5/23287

FOREIGN PATENT DOCUMENTS

| KR | 20-2011-0008714 U | 9/2011 |
| KR | 10-2018-0012150 A | 2/2018 |
| KR | 10-2018-0041040 A | 4/2018 |
| KR | 10-2018-0137278 A | 12/2018 |
| KR | 10-2019-0119379 A | 10/2019 |

OTHER PUBLICATIONS

Korean Office Action dated Mar. 5, 2021 in counterpart Korean Patent Application No. 10-2020-0064078 (6 pages in English, 5 pages in Korean).

\* cited by examiner

*Primary Examiner* — Noam Reisner
(74) *Attorney, Agent, or Firm* — NSIP Law

(57) ABSTRACT

A camera module is provided. The camera module includes a housing, and a first lens module and a second lens module disposed in the housing and individually movable in an optical axis direction, the first and second lens modules being configured to generate rolling friction on one of both sides of each of the first and second lens modules and sliding friction on the other of both sides when the first and second lens modules are moved.

18 Claims, 19 Drawing Sheets

CAMERA MODULE

CROSS-REFERENCE TO RELATED APPLICATION(S)

This application claims the benefit under 35 USC 119(a) of Korean Patent Application No. 10-2020-0064078 filed on May 28, 2020 in the Korean Intellectual Property Office, the entire disclosure of which is incorporated herein by reference for all purposes.

BACKGROUND

1. Field

The following description relates to a camera module.

2. Description of Related Art

Recently, in order to reduce the thickness of portable electronic devices, such as, but not limited to, smartphones, camera module having a reflective member that changes a path of light and having a plurality of lens modules disposed in a length direction or a width direction, rather than in the thickness direction of the portable electronic device, has been proposed.

The camera module may implement an autofocusing function and a zoom function by moving a plurality of lens modules in the optical axis direction (e.g., the length direction or the width direction of the portable electronic device).

When moving the plurality of lens modules, in the example in which both sides of all of the plurality of lens modules are supported by the ball members, guide grooves for accommodating the ball members should be provided on both sides of the plurality of lens modules. Therefore, there is a limit with regard to how much the size of the plurality of lens modules (or the camera module) may be reduced.

Additionally, when a zoom function is implemented by moving an interval between a plurality of lens modules, since a space in which each lens module is moved should be secured, there may be a problem such as difficulty in reducing the size of the camera module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, a camera module includes a housing; and a first lens module and a second lens module disposed in the housing, and individually movable in an optical axis direction, wherein the first lens module is configured to generate rolling friction on a first side of two sides of the first lens module, and generate sliding friction on a second side of the two sides of the first lens module when the first lens module is moved, and wherein the second lens module is configured to generate rolling friction on a first side of two sides of the second lens module, and generate sliding friction on a second side of the two sides of the second lens module when the second lens module is moved.

The first side and the second side of each of the first lens module and the second lens module may be configured to have different lengths in the optical axis direction.

Among the first side of the first lens module and the second lens module, and the second side of the first lens module and the second lens module, a longer side in the optical axis direction may be supported by a ball member, and a shorter side in the optical axis direction is supported by the housing.

The shorter side in the optical axis direction and the housing may be in line contact with each other.

A longer side of the first lens module in the optical axis direction of the first lens module may be movable to be disposed in a space between a shorter side of the second lens module in the optical axis direction and a bottom surface of the housing.

A longer side of the second lens module in the optical axis direction of the second lens module may be movable to be disposed in a space between a shorter side of the first lens module in the optical axis direction and a bottom surface of the housing.

The first lens module may include a first body portion provided with a lens, a first extension portion that extends from a first side of the first body portion in the optical axis direction, and a first support portion provided on a second side of the first body portion, the second lens module may include a second body portion provided with a lens, a second support portion provided on a first side of the second body portion, and a second extension portion that extends from a second side of the second body portion in the optical axis direction, the first extension portion of the first lens module is configured to have a length in the optical axis direction that is greater than the first support portion, and the second extension portion of the second lens module is configured to have a length in the optical axis direction that is greater than the second support portion.

A first ball member may be disposed between the first extension portion of the first lens module and a bottom surface of the housing, and a portion of the first support portion is contacted and supported by the housing, and a second ball member is disposed between the second extension portion and the bottom surface of the housing, and a portion of the second support portion is contacted and supported by the housing.

An inner surface of the housing may be provided with a first stepped portion in contact with the first support portion, and a second stepped portion in contact with the second support portion.

The portion of the first support portion and the portion of the second support portion, contacting the housing, may each include a curved surface.

The first support portion and a bottom surface of the housing may be provided with a first accommodation space therebetween, and the second support portion and the bottom surface of the housing may be provided with a second accommodation space therebetween.

The first lens module may be movable such that the first extension portion is disposed in the second accommodation space, and the second lens module may be movable such that the second extension portion is disposed in the first accommodation space.

The first extension portion may be provided with a first magnet disposed thereon, and a first coil may be disposed to face the first magnet, and the second extension portion may be provided with a second magnet disposed thereon, and a second coil is disposed to face the second magnet.

The housing may be provided with a reflection module disposed therein, and the reflection module is configured to change a path of light such that light is directed to the first and second lens modules.

The reflection module may be configured to be rotatable about two axes, perpendicular to the optical axis direction and perpendicular to each other.

In a general aspect, a camera module includes a housing; a first lens module, having a first extension portion disposed on a first side, and a first support portion disposed on a second side, a length of the first extension portion being different from a length of the first support portion; a second lens module, having a second extension portion disposed on a first side, and a second support portion disposed on a second side, a length of the second extension portion being different from a length of the second support portion; wherein the first lens module and the second lens module are configured to move in an optical axis direction, and are configured to overlap in a direction perpendicular to the optical axis direction.

The first extension portion and the second extension portion may be configured to extend in the optical axis direction.

A direction in which the first extension portion extends, and a direction in which the second extension portion extends may be opposite to each other.

Other features and aspects will be apparent from the following detailed description, the drawings, and the claims.

Figure 1:
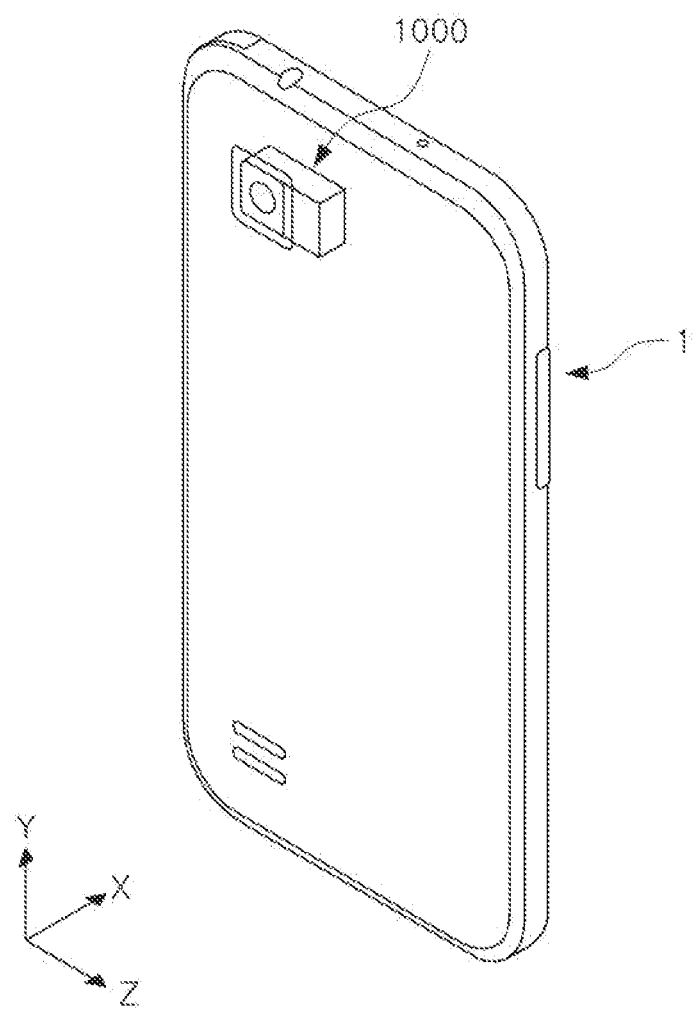
FIG. 1 illustrates a perspective view of an example portable electronic device equipped with a camera module, in accordance with one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, Also, descriptions of features that are known in the art may be omitted for increased clarity and conciseness.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above"

or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

FIG. 1 illustrates a perspective view of an example portable electronic device provided with an example camera module, in accordance with one or more embodiments.

Referring to FIG. 1, an example camera module 1000 according to an example may be mounted on a portable electronic device 1. The portable electronic device 1 may be, as non-limiting examples, a portable electronic device such as a mobile communication terminal, a smartphone, or a tablet PC.

As illustrated in FIG. 1, the portable electronic device 1 is equipped with the camera module 1000 that is configured to image an object.

In this example, the camera module 1000 may include a plurality of lenses. The optical axis (the Z-axis) of the plurality of lenses may face a direction (the X-axis direction, the direction from the front surface to the rear surface of the portable electronic device 1 or vice versa) perpendicular to a thickness direction of the portable electronic device 1.

In an example, the optical axis (the Z-axis) of the plurality of lenses provided in the camera module 1000 may be formed in the width direction or the length direction of the portable electronic device 1.

Therefore, even when the camera module 1000 has functions such as autofocusing (hereinafter, referred to as AF), optical zoom (hereinafter, referred to as zoom), optical image stabilization (hereinafter, referred to as OIS) and the like, the thickness of the portable electronic device 1 may not be increased. Accordingly, the size of the portable electronic device 1 may be reduced.

The camera module 1000 according to an example may include at least one of AF, zoom, and OIS functions.

Since the camera module 1000 including AF, Zoom, and OIS functions needs to be provided with various components, the size of the camera module is increased, as compared to a general camera module.

In the example in which the size of the camera module 1000 increases, the portable electronic device 1 on which the camera module 1000 is mounted, may not be miniaturized.

In an example, the camera module may include a plurality of lens groups that are configured to implement the zoom function. In this example, when the plurality of lens groups are disposed in the thickness direction of the portable electronic device, the thickness of the portable electronic device may also increase based on the number of lens groups. Accordingly, if the thickness of the portable electronic device is not increased, the number of lens groups cannot be sufficiently secured, and the zoom performance is weakened.

Additionally, to implement AF, Zoom, and OIS functions, an actuator that moves a plurality of lens groups in an optical axis direction or a direction perpendicular to the optical axis and the like should be installed. However, if the optical axis (the Z-axis) of the lens group is formed in the thickness direction of the portable electronic device, the actuator that moves the lens group may also be installed in the thickness direction of the portable electronic device. Therefore, the thickness of the portable electronic device is increased.

However, in the implementation of the camera module 1000 according to an example of the present disclosure, since the optical axis (the Z-axis) of a plurality of lenses is perpendicular to the thickness direction (the X-axis direction) of the portable electronic device 1, even when the camera module 1000 having the AF, zoom and OIS functions is mounted, the portable electronic device 1 may be relatively thinned.

Figure 2:
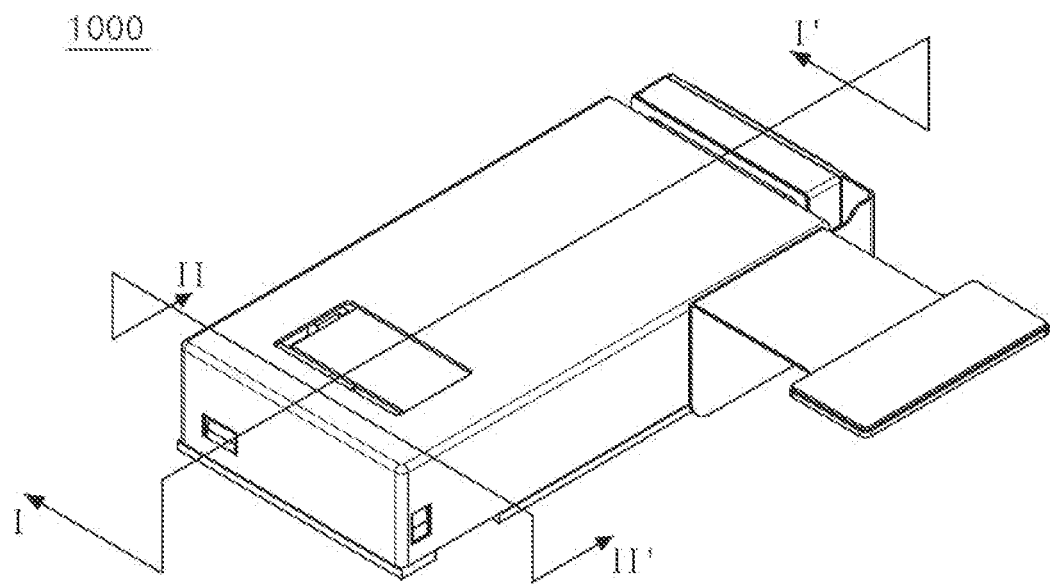
FIG. 2 illustrates a schematic perspective view of an example camera module, in accordance with one or more embodiments.
Figure 3A:
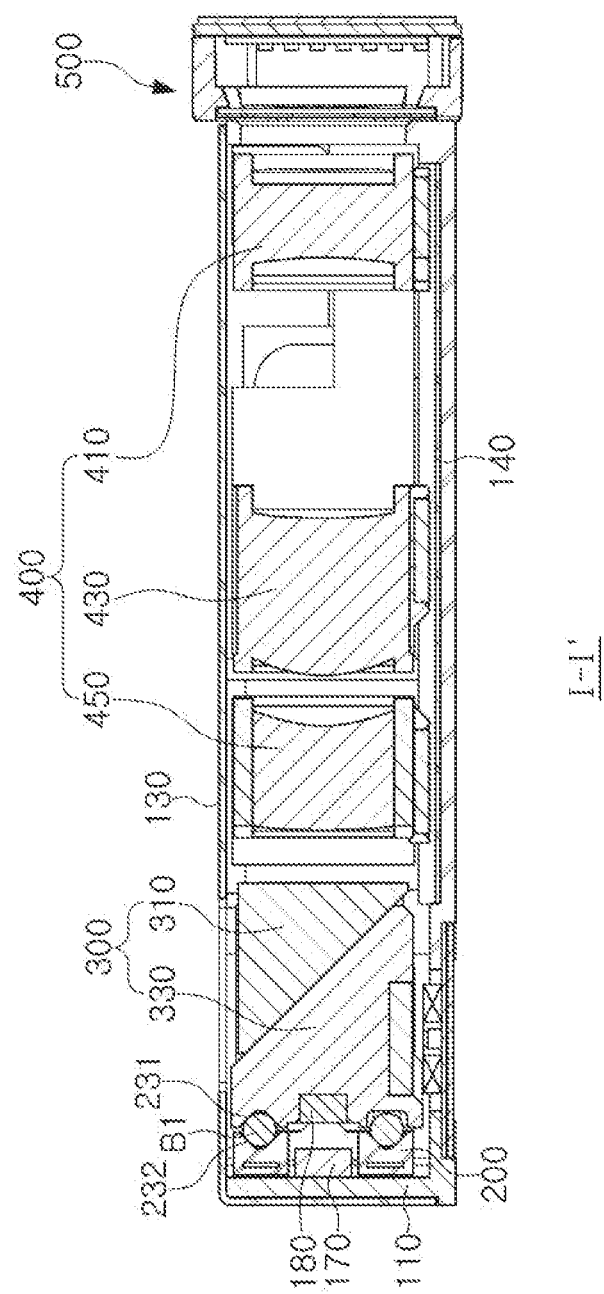
FIG. 3A illustrates a cross-sectional view taken along line I-I' of FIG. 2.
Figure 3B:
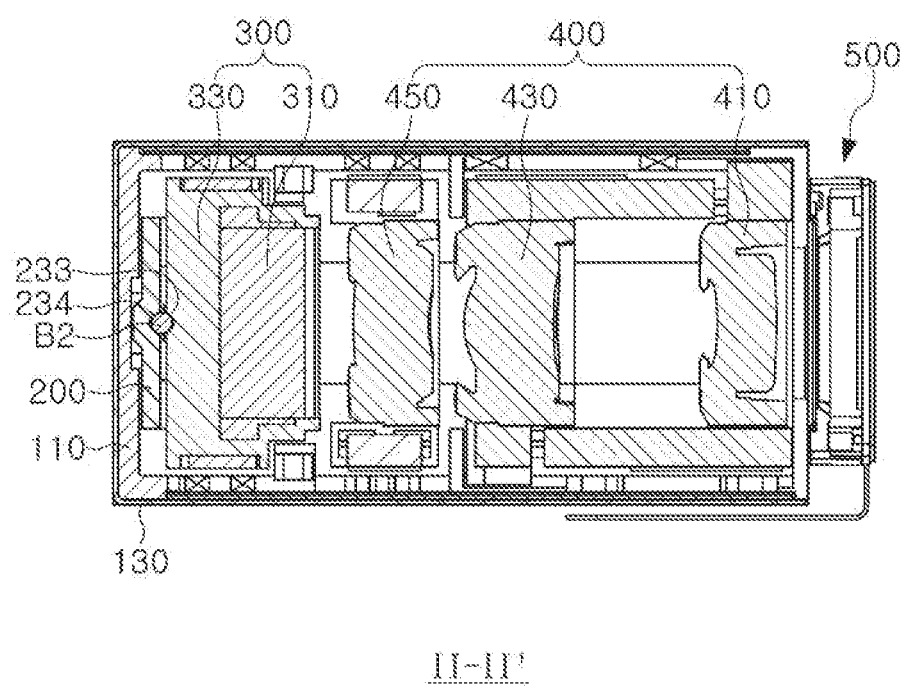
FIG. 3B is a cross-sectional view taken along line II-II' of FIG. 2.

FIG. 2 illustrates a schematic perspective view of an example camera module, in accordance with one or more embodiments, FIG. 3A is a cross-sectional view taken along line I-I' of FIG. 2, and FIG. 3B is a cross-sectional view taken along line II-II' of FIG. 2.

Figure 4:
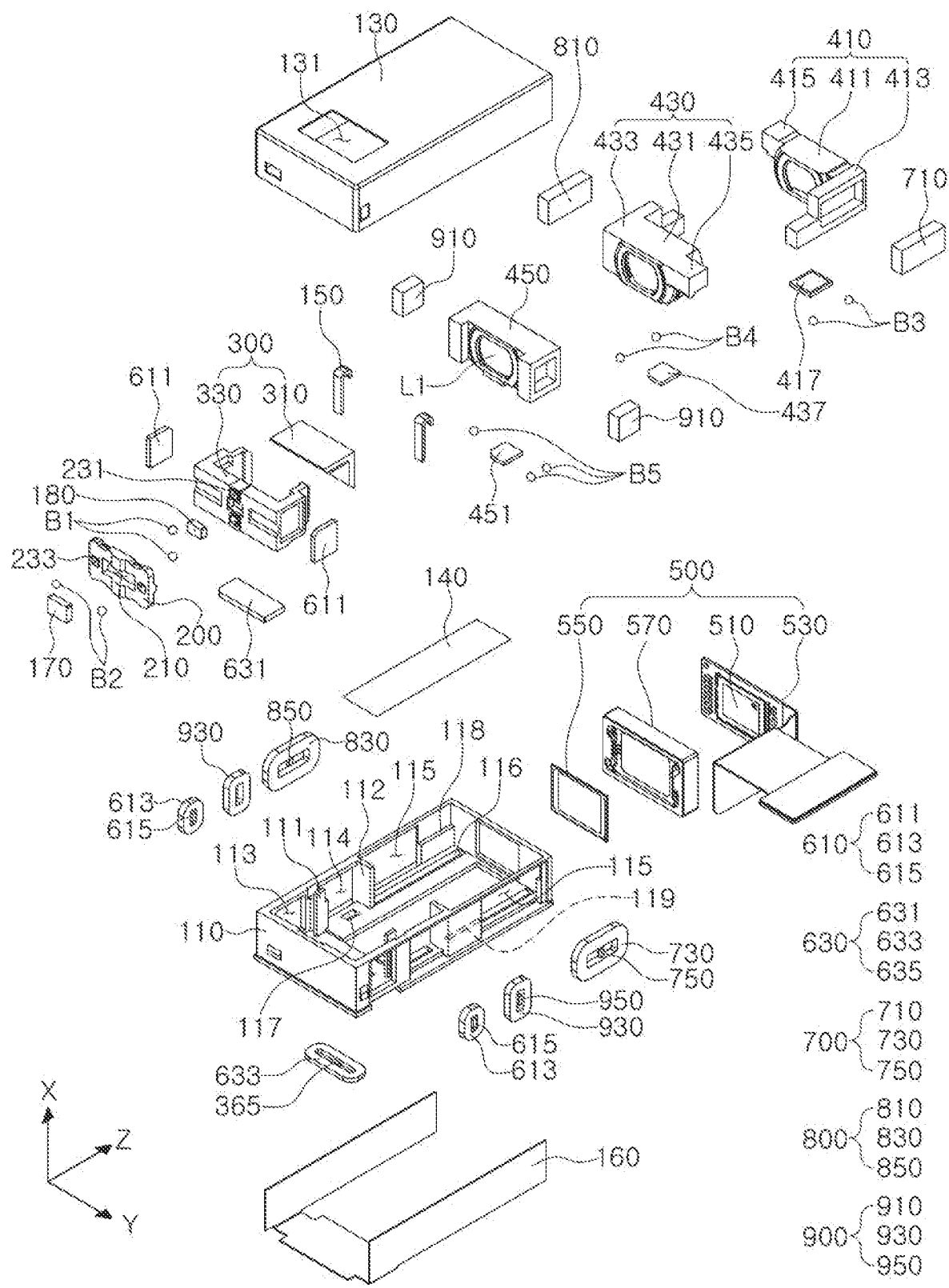
FIG. 4 illustrates a schematic exploded perspective view of an example camera module, in accordance with one or more embodiments.
Figure 5:
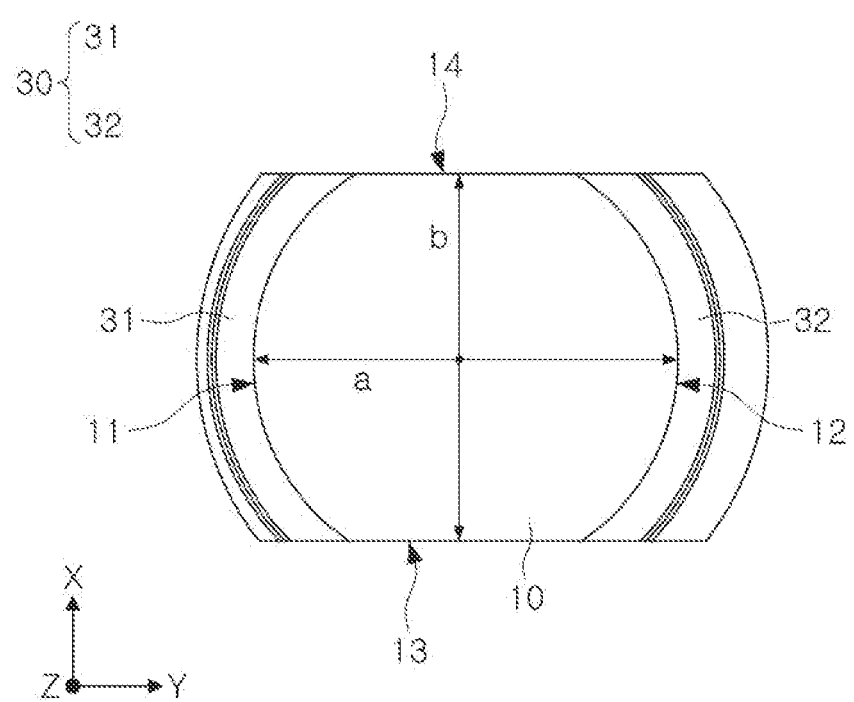
FIG. 5 illustrates a plan view of an example lens provided in an example camera module, in accordance with one or more embodiments.

FIG. 4 illustrates a schematic exploded perspective view of a camera module, in accordance with one or more embodiments, and FIG. 5 is a plan view of an example lens provided in the camera module, in accordance with one or more embodiments.

Referring to FIGS. 2 to 4, the camera module 1000 includes a housing 110, a reflection module 300, a lens module 400, an image sensor module 500 and a case 130.

Inside the housing 110, the reflection module 300, the lens module 400, and the image sensor module 500 are disposed from a first side to a second side. The housing 110 is provided with an interior space to accommodate the reflection module 300, the lens module 400 and the image sensor module 500. However, in an example, the image sensor module 500 may be disposed in a position external to the housing 110.

In a non-limiting example, the housing 110 may have a box shape with an open top.

The case 130 is coupled to the housing 110 to cover the upper portion of the housing 110. The case 130 may have an opening 131 that allows light to enter. The light incident through the opening 131 of the case 130 may be changed by the reflection module 300 to enter the lens module 400.

The reflection module 300 is configured to change the traveling direction of light. For example, the traveling direction of light incident into the housing 110 may be changed to be directed to the lens module 400 through the reflection module 300.

The reflective module 300 may include a reflective member 310, and a holder 330 on which the reflective member 310 is mounted.

The reflective member 310 may be configured to change the traveling direction of light. In an example, the reflective member 310 may be a mirror or a prism configured to reflect light.

The path of light incident through the opening 131 of the case 130 may be changed to face the lens module 400 based on the reflection module 300. In an example, the light incident in the thickness direction (the X-axis direction) of the camera module 1000 may be changed by the reflection module 300 so that the path of light is substantially coincident with the optical axis direction (the Z-axis direction).

The lens module 400 may include a plurality of lenses through which the light, of which a direction of travel has been changed by the reflection module 300, passes. In an example, the lens module 400 may include a first lens module 410, a second lens module 430, and a third lens module 450. In FIG. 4, the lens module 400 is described as including three lens modules, for example, first to third lens modules 410, 430 and 450. However, the configuration is not limited thereto, and the lens module 400 may include at least two lens modules.

Among the first to third lens modules 410, 430 and 450, the third lens module 450 may be disposed closest to the reflection module 300, and the first lens module 410 may be disposed closest to the image sensor module 500. The second lens module 430 may be disposed between the first lens module 410 and the third lens module 450.

The first to third lens modules 410, 430 and 450 are movable so that the distance therebetween is variable. In an example, the first to third lens modules 410, 430 and 450 may be respectively moved in the optical axis direction (the Z-axis direction).

The zoom function may be implemented by moving one or both of the first and second lens modules 410 and 430 and the autofocus function may be implemented by moving the third lens module 450.

On the other hand, in an example, when the lens module 400 includes two lens modules, either or both of the two lens modules may be moved in the optical axis direction (the Z-axis direction) to implement an autofocusing function and a zoom function.

The housing 110 may include an interior space in which the reflection module 300, the first lens module 410, the second lens module 430, and the third lens module 450 are disposed.

Referring to FIG. 4, the housing 110 may be provided with a first protruding wall 111. In an example, the first protruding wall 111 may have a shape that protrudes toward two inner surfaces of the housing 110.

The inner space of the housing 110 may be divided into a space in which the reflective module 300 is disposed, and a space in which the lens module 400 is disposed, by the first protruding wall 111. In an example, based on the first protruding wall 111, the reflective module 300 may be disposed in a front portion of the module, and the lens module 400 may be disposed in a rear portion of the module.

The housing 110 may be provided with a second protruding wall 112. In an example, the second protruding wall 112 may be shaped to protrude toward two inner surfaces of the housing 110.

The inner space of the housing 110 may be divided into a space in which the third lens module 450 is disposed and a space in which the first and second lens modules 410 and 430 are disposed, by the second protruding wall 112. In an example, based on the second protruding wall 112, the third lens module 450 may be disposed in a front portion of the camera module, and the first and second lens modules 410 and 430 may be disposed in a rear portion of the camera module.

Each lens module may be provided with at least one lens. In FIG. 4, a lens L1 (hereinafter referred to as a first lens) provided in the third lens module 450 is illustrated for convenience of description.

The image sensor module 500 may include an image sensor 510, a printed circuit board 530, an infrared cut filter 550, and a sensor housing 570.

The image sensor 510 may be connected to the printed circuit board 530 by a bonding wire, and the printed circuit board 530 may be coupled to the sensor housing 570.

The infrared cut filter 550 may block light in the infrared region among the light that has passed through the lens module 400, and may be coupled to the sensor housing 570.

Based on the configuration of the lens module 400, the reflection module 300 may be disposed on a front side (the left side based on FIG. 2) of the lens module 400, and the image sensor module 500 may be disposed on a rear side (the right side based on FIG. 2) of the lens module 400.

At least one of the lenses provided in each lens module may have a non-circular planar shape. In an example, the first lens L1 may be non-circular when viewed in the optical axis direction (the Z-axis direction). On the other hand, all lenses provided in each lens module may also have a non-circular planar shape.

Referring to FIG. 5, in a plane perpendicular to the optical axis (the Z-axis), the first lens L1 may have a length in the first axial direction (the X-axis direction) perpendicular to the optical axis (the Z-axis), less than a length in the second axial direction (the Y-axis direction) perpendicular to both the optical axis (the Z-axis) and the first axial direction (the X-axis direction).

In an example, the first lens L1 may have a major axis and a minor axis. The line segment connecting both sides of the first lens L1 in the first axial direction (the X-axis direction) while passing through the optical axis (the Z-axis) is the minor axis, and the line segment connecting both sides of the first lens L1 in the second axial direction (the Y-axis direction) while passing through the optical axis (the Z-axis) is the major axis. The major axis and the minor axis are perpendicular to each other, and the length of the major axis is greater than that of the minor axis.

The first lens L1 includes an optical unit 10 and a flange portion 30.

The optical unit 10 may be a portion in which the optical performance of the first lens L1 is exhibited. In an example, light reflected from a subject may be refracted while passing through the optical unit 10.

The optical unit 10 may have refractive power and may have an aspherical shape.

The flange portion 30 may be configured to fix the first lens L1 to another configuration, for example, a lens module or another lens.

The flange portion 30 may extend from the optical unit 10, and may be integrally formed with the optical unit 10.

The optical unit 10 may be formed in a non-circular shape. In an example, the optical unit 10 may be non-circular when viewed in the optical axis direction (the Z-axis direction). Referring to FIG. 5, in a plane perpendicular to the optical axis (the Z-axis), the optical unit 10 may have a length in the first axial direction (the X-axis direction) perpendicular to the optical axis (the Z-axis), that is less than a length in the second axial direction (the Y-axis direction) perpendicular to both the optical axis (the Z-axis) and the first axial direction (the X-axis direction).

The optical unit 10 includes a first edge 11, a second edge 12, a third edge 13 and a fourth edge 14.

When viewed in the optical axis direction (the Z-axis direction), the first edge 11 and the second edge 12 may each have an arc shape.

The second edge 12 may be provided on the opposite side of the first edge 11. Further, the first edge 11 and the second edge 12 may be positioned to oppose each other, based on the optical axis (the Z-axis).

The fourth edge 14 may be provided on the opposite side of the third edge 13. In addition, the third edge 13 and the fourth edge 14 are positioned to oppose each other, based on the optical axis (the Z-axis).

The third edge 13 and the fourth edge 14 respectively connect the first edge 11 and the second edge 12. The third edge 13 and the fourth edge 14 may be symmetrical with respect to the optical axis (the Z-axis), and may be formed in parallel with each other.

When viewed in the optical axis direction (the Z-axis direction), the first edge 11 and the second edge 12 include an arc shape, and the third edge 13 and the fourth edge 14 include a substantially linear shape.

The optical unit 10 may have a major axis (a) and a minor axis (b). The line segment connecting the third edge 13 and the fourth edge 14 at a shortest distance while passing through the optical axis (the Z-axis) is the minor axis (b). The line segment, which connects the first edge 11 and the second edge 12 while passing through the optical axis (the Z-axis) and which is perpendicular to the minor axis (b), is the major axis (a). The length of the major axis (a) may be greater than the length of the minor axis (b).

The flange portion 30 extends in the second axial direction (the Y-axis direction) along the circumference of a portion of the optical unit 10. At least a portion of the flange portion 30 may be in contact with the inner surface of the lens module.

The flange portion 30 may include a first flange portion 31 and a second flange portion 32. The first flange portion 31 may extend from the first edge 11 of the optical unit 10, and the second flange portion 32 may extend from the second edge 12 of the optical unit 10.

The first edge 11 of the optical unit 10 may indicate a portion adjacent to the first flange portion 31, and the second edge 12 of the optical unit 10 may indicate a portion adjacent to the second flange portion 32.

The third edge 13 of the optical unit 10 may indicate a first side of the optical unit 10 on which the flange portion 30 is not formed, and the fourth edge 14 of the optical unit 10 may indicate a second side of the optical unit 10 on which the flange portion 30 is not formed.

On the other hand, referring to FIG. 4, the first lens L1 may be disposed in such a manner that one of sides thereof facing the first axial direction (the X-axis direction) faces the bottom surface of the housing 110, and sides thereof facing the second axial direction (the Y-axis direction) face the inner surfaces of the housing 110, respectively.

In an example, the first lens L1 may be disposed such that the side surfaces facing the first axial direction (the X-axis direction) face the thickness direction (the X-axis direction) of the housing 110, and the side surfaces facing the second axial direction (the Y-axis direction) face the width direction (the Y-axis direction) of the housing 110.

Since the length of the first lens L1 in the first axial direction (the X-axis direction) may be shorter than the length in the second axial direction (the Y-axis direction), the thickness of the housing 110 may be reduced.

Figure 6:
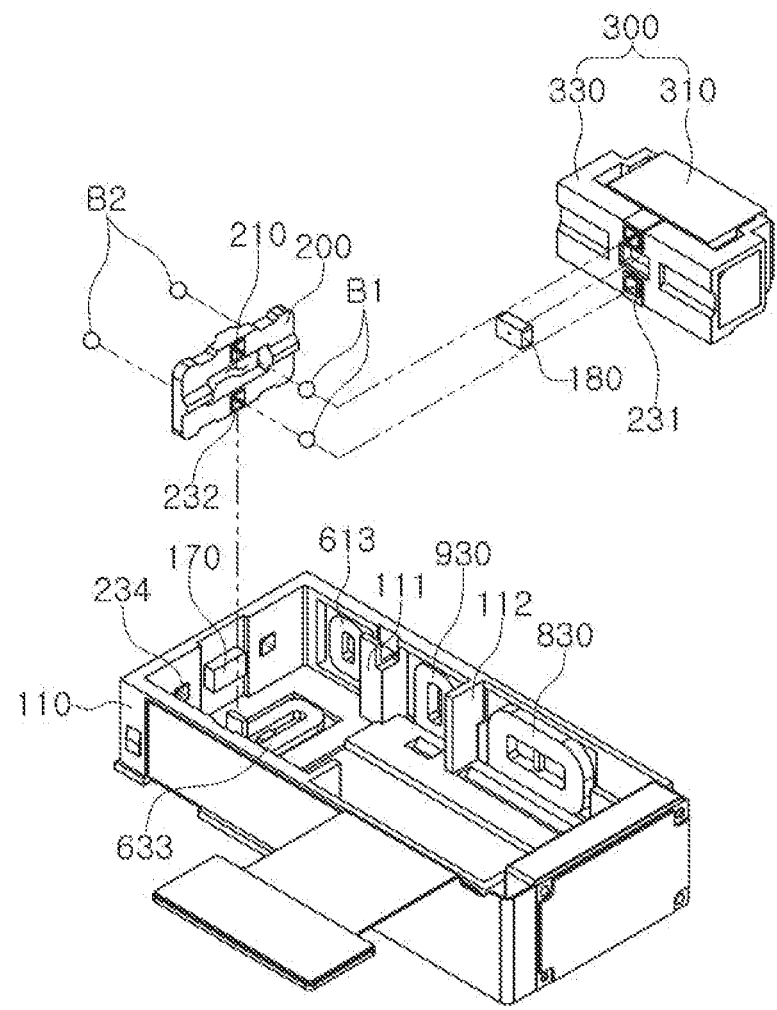
FIG. 6 illustrates an exploded perspective view of a housing, a guide member and a reflection module of an example camera module, in accordance with one or more embodiments.
Figure 7A:
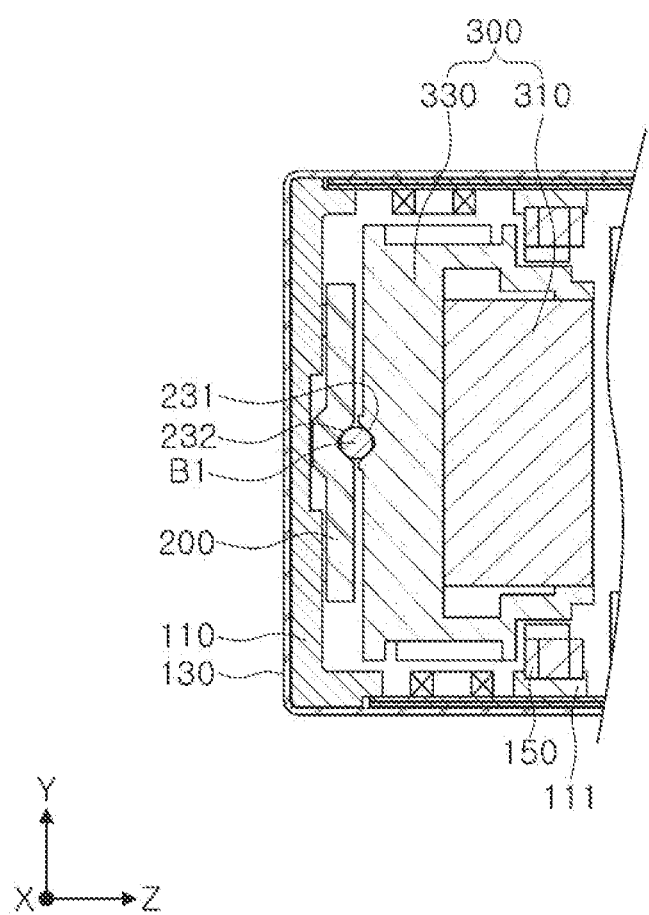
FIGS. 7A to 7C are views schematically illustrating a state in which a reflection module is rotated with a first axis (an X axis) as a rotation axis.
Figure 7B:
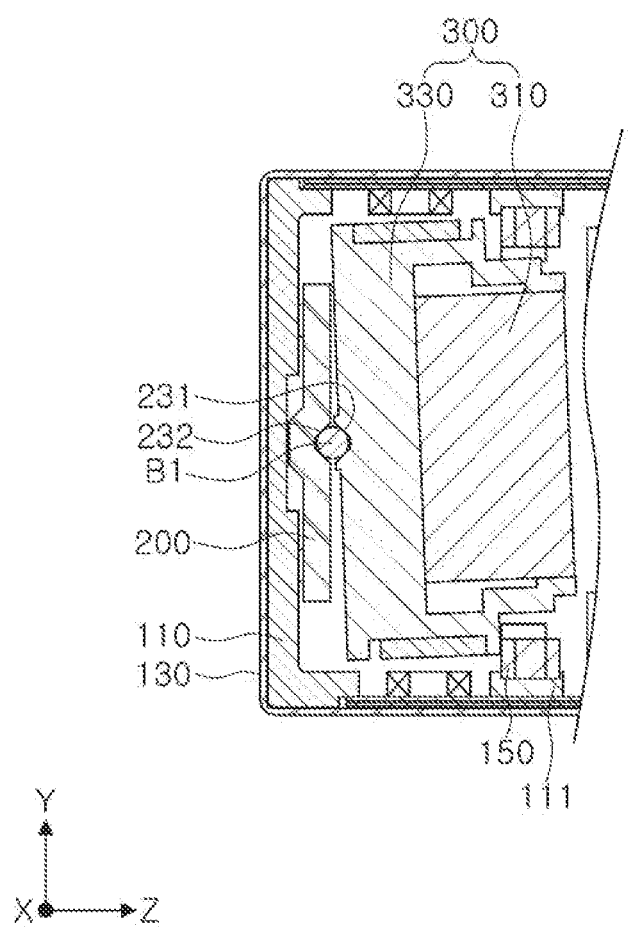
Figure 7C:
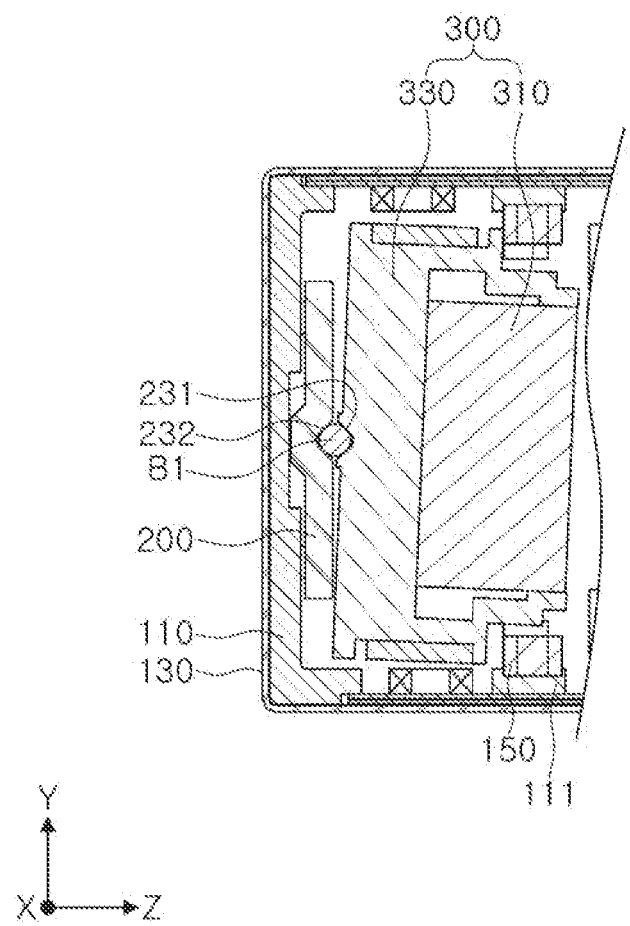
Figure 8A:
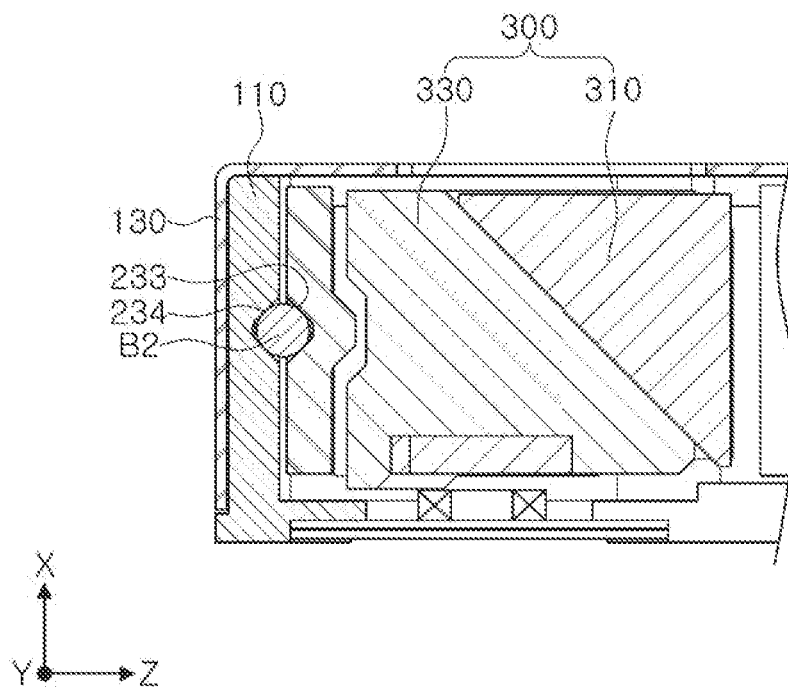
FIGS. 8A to 8C are views schematically illustrating a state in which a reflection module is rotated using a second axis (a Y axis) as the rotation axis.
Figure 8B:
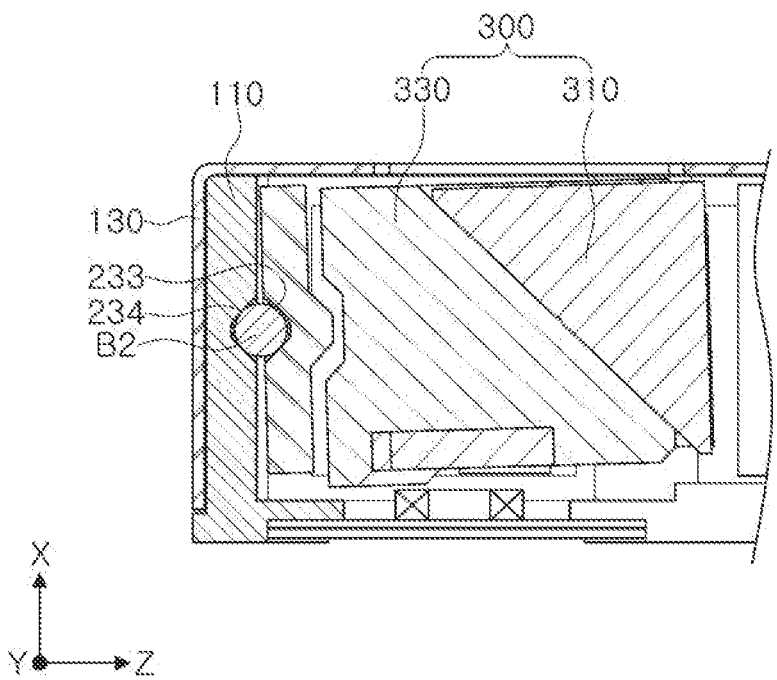
Figure 8C:
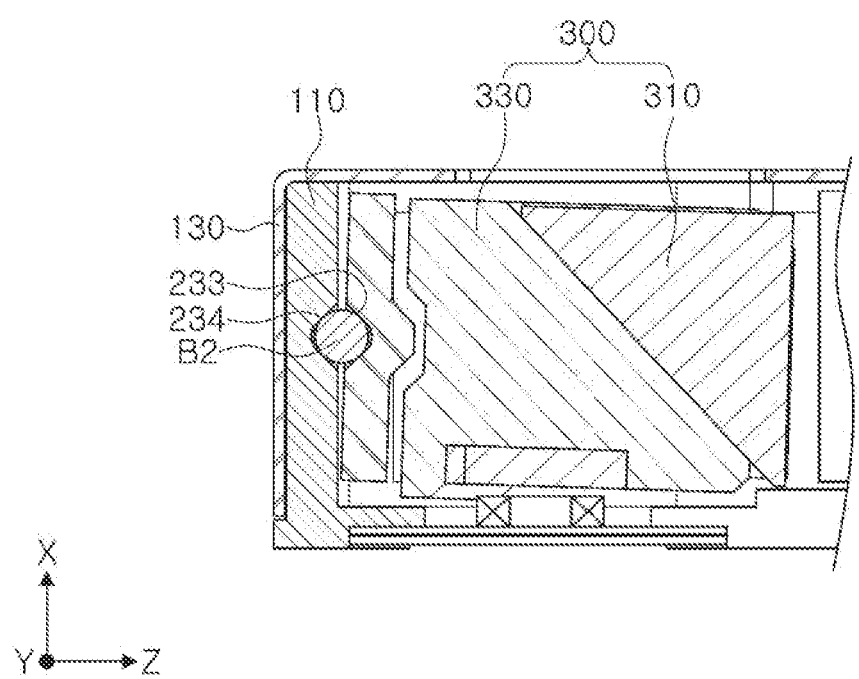

FIG. 6 is an exploded perspective view of a housing, a guide member, and a reflection module of an example camera module, in accordance with one or more embodiments, and FIGS. 7A to 7C are views schematically illustrating that the reflection module may be rotated using the first axis (the X-axis) as a rotation axis. FIGS. 8A to 8C are views schematically illustrating a state in which the reflection module is rotated using the second axis (the Y-axis) as a rotation axis.

The reflection module 300 is disposed in the inner space of the housing 110 and may be pulled toward the housing 110. In an example, the reflection module 300 may be pulled toward the inner surface of the housing 110 in the optical axis direction (the Z-axis direction).

Accordingly, a pulling yoke 170 is disposed in the housing 110, and a pulling magnet 180 is disposed in the reflection module 300. The pulling yoke 170 and the pulling magnet 180 are disposed to face each other in the optical axis direction (the Z-axis direction). The pulling yoke 170 may be a magnetic body.

Therefore, the pulling yoke 170 and the pulling magnet 180 generate attractive force in the optical axis direction (the Z-axis direction), and accordingly, the reflection module 300 may be pressed toward the housing 110.

In an example, the mounting positions of the pulling yoke 170 and the pulling magnet 180 may be interchangeable. In another example, the pulling magnet 180 may also be respectively mounted on the housing 110 and the reflection module 300.

A guide member 200 may be disposed in front of the reflection module 300. The guide member 200 may be disposed between the inner surface of the housing 110 and the reflective module 300. In an example, the guide member 200 may be disposed between the inner surface of the housing 110 on which the pulling yoke 170 is disposed and the reflective module 300 on which the pulling magnet 180 is disposed.

The guide member 200 may have a plate shape, and may have a through-hole 210 such that the pulling yoke 170 and the pulling magnet 180 face each other directly therethrough.

Since the pulling yoke 170 and the pulling magnet 180 may be disposed to directly face each other, the force pulling the reflective module 300 may be significantly increased. Additionally, the camera module 1000 may be miniaturized in the optical axis direction (the Z-axis direction).

Since the attraction force acts in the optical axis direction (the Z-axis direction) between the pulling yoke 170 and the pulling magnet 180, the reflective module 300 and the guide member 200 may be pressed toward the housing 110 in the optical axis direction (the Z-axis direction).

At least one first ball member B1 may be disposed between the guide member 200 and the reflective module 300, and at least one second ball member B2 may be disposed between the housing 110 and the guide member 200.

The first ball member B1 includes a plurality of ball members spaced apart from each other on the first axis (the X-axis), and the second ball member B2 includes a plurality of ball members spaced apart from each other on the second axis (the Y-axis).

Based on the attraction force between the pulling yoke 170 and the pulling magnet 180, the first ball member B1 may be in contact with the guide member 200 and the reflection module 300, and the second ball member B2 may be in contact with the housing 110 and the guide member 200.

Accommodation grooves in which the first ball member B1 is respectively accommodated are provided in surfaces at which the guide member 200 and the reflective module 300 face each other. In an example, a first accommodation groove 231 and a second accommodation groove 232 are provided in the surfaces at which the guide member 200 and the reflection module 300 face each other in the optical axis direction (the Z-axis direction), and the first ball member B1 may be disposed between the first accommodation groove 231 and the second accommodation groove 232.

The first accommodation groove 231 and the second accommodation groove 232 each include a plurality of accommodation grooves spaced apart on the first axis (the X-axis).

In surfaces at which the housing 110 and the guide member 200 face each other, accommodation grooves for accommodating the second ball member B2 may be respectively provided. In an example, a third accommodation groove 233 (as illustrated in FIG. 4) and a fourth accommodation groove 234 may be provided in surfaces at which the housing 110 and the guide member 200 face each other in the optical axis direction (the Z-axis direction), and the second ball member B2 may be disposed between the third accommodation groove 233 and the fourth accommodation groove 234.

The third accommodation groove 233 and the fourth accommodation groove 234 each include a plurality of accommodation grooves spaced apart from each other on the second axis (the Y-axis).

The camera module 1000, according to an example, may correct the handshake during the capture of an image by rotating the reflection module 300.

In an example, when handshake occurs during image capture, the handshake may be corrected by applying a relative displacement corresponding to the shake to the reflection module 300.

The reflection module 300 may be rotated based on the first axis (the X-axis) and the second axis (the Y-axis). In an example, the reflection module 300 may be rotated relative to the guide member 200 using the first axis (the X-axis) as the rotation axis. Additionally, the reflection module 300 may be rotated relative to the housing 110 together with the guide member 200 using the second axis (the Y-axis) as the rotation axis.

The first ball member B1 may be disposed between the guide member 200 and the reflective module 300, and the first ball member B1 includes a plurality of ball members disposed along the first axis (the X-axis). Accordingly, the reflection module 300 may be rotated using the first axis (the X-axis) as the rotation axis, while being supported by the first ball member B1 (see FIGS. 7A to 7C).

Since the first ball member B1 includes a plurality of ball members disposed along the first axis (the X-axis), the reflection module 300 may be rotated relative to the guide member 200 using the first axis (the X-axis) as the rotation axis. On the other hand, the relative rotation of the reflection module 300 with respect to the guide member 200 by using the second axis (the Y-axis) as the rotation axis is restricted.

The second ball member B2 may be disposed between the housing 110 and the guide member 200, and the second ball member B2 includes a plurality of ball members disposed along the second axis (the Y-axis). Therefore, the guide member 200 may be rotated using the second axis (the Y-axis) as the rotation axis, while being supported by the second ball member B2 (see FIGS. 8A to 8C).

Since the second ball member B2 includes a plurality of ball members disposed along the second axis (the Y-axis), the guide member 200 may be rotated relative to the housing 110 using the second axis (the Y-axis) as the rotation axis. On the other hand, the relative rotation of the guide member 200 with respect to the housing 110 by using the first axis (the X-axis) as the rotation axis is restricted.

In this example, the reflection module 300 may be rotated relative to the housing 110 together with the guide member 200, using the second axis (the Y-axis) as the rotation axis.

A driving unit may be provided to rotate the reflective module 300. For example, the camera module 1000, according to an example, includes a first driving unit 610 that rotates the reflection module 300 using the first axis (the X-axis) as the rotation axis, and a second driving unit 630 that rotates the reflection module 300 using the second axis (the Y-axis) as the rotation axis (see FIG. 4).

The first driving unit 610 includes a first magnet 611 and a first coil 613.

The first magnet 611 is mounted on the reflection module 300. In an example, the first magnet 611 is disposed on the side of the holder 330.

The first coil 613 is disposed to face the first magnet 611 in a direction perpendicular to the optical axis direction (the Z-axis direction). In an example, the housing 110 is provided with a through-hole 113 in which the first coil 613 is disposed, and the first coil 613 is disposed in the through-hole 113 to face the first magnet 611 in the second axial direction (the Y-axis direction). The first coil 613 may be provided on a substrate 160 coupled to the housing 110 (see FIG. 4).

The first magnet 611 may include a plurality of magnets disposed on both sides of the holder 330, and the first coil 613 may also include a plurality of coils corresponding to the first magnet 611.

The first magnet 611 and the first coil 613 generate a driving force in directions facing each other. For example, the first magnet 611 and the first coil 613 generate a driving force in the second axial direction (the Y-axis direction).

Therefore, based on the driving force of the first magnet 611 and the first coil 613, the reflection module 300 may be rotated with the first axis (the X-axis) as the rotation axis.

The second driving unit 630 includes a second magnet 631 and a second coil 633.

The second magnet 631 is mounted on the reflection module 300. For example, the second magnet 631 is disposed on the lower surface of the holder 330.

The second coil 633 is disposed to face the second magnet 631 in a direction perpendicular to the optical axis direction (the Z-axis direction). In an example, the bottom surface of the housing 110 is provided with a through-hole in which the second coil 633 is disposed, and the second coil 633 is disposed in the through-hole to face the second magnet 631 in the first axial direction (the X-axis direction). The second coil 633 may be provided on the substrate 160 coupled to the housing 110 (see FIG. 4).

The second magnet 631 and the second coil 633 generate driving forces in directions facing each other. In an example, the second magnet 631 and the second coil 633 generate driving forces in the first axial direction (the X-axis direction).

Therefore, on the basis of the driving force of the second magnet 631 and the second coil 633, the reflection module 300 may be rotated together with the guide member 200 using the second axis (the Y-axis) as the rotation axis.

The first driving unit 610 and the second driving unit 630 generate driving forces in directions perpendicular to each other.

The reflection module 300 may be rotated with the first axis (the X-axis) as the rotation axis (see FIGS. 7A, 7B and 7C), and the reflection module 300 and the guide member 200 may be rotated together using the second axis as the rotation axis (see FIGS. 8A, 8B and 8C).

In this example, referring to FIGS. 4 and 7A to 8C, the camera module 1000, according to an example, includes a stopper 150 fitted to the first protruding wall 111 of the housing 110.

The stopper 150 may have a hook shape, and may be disposed in such a manner that a hook portion is hung on an upper portion of the first protruding wall 111.

The stopper 150 may limit the rotation range of the reflection module 300.

A buffer member may be attached to the stopper 150. The buffer member may be formed of a material having elasticity. Therefore, when the reflection module 300 collides with the stopper 150, shock and noise may be reduced.

The camera module 1000, according to an example, uses a closed loop control method of detecting and feeding back the position of the reflection module 300.

Accordingly, a first position sensor 615 and a second position sensor 635 may be provided to sense the position of the reflection module 300.

The first position sensor 615 may be disposed in an inner hollow portion of the first coil 613 to face the first magnet 611, and the second position sensor 635 may be disposed in an inner hollow portion of the second coil 633 to face the second magnet 631.

In an example, the first position sensor 615 and the second position sensor 635 may be hall sensors.

Figure 9:
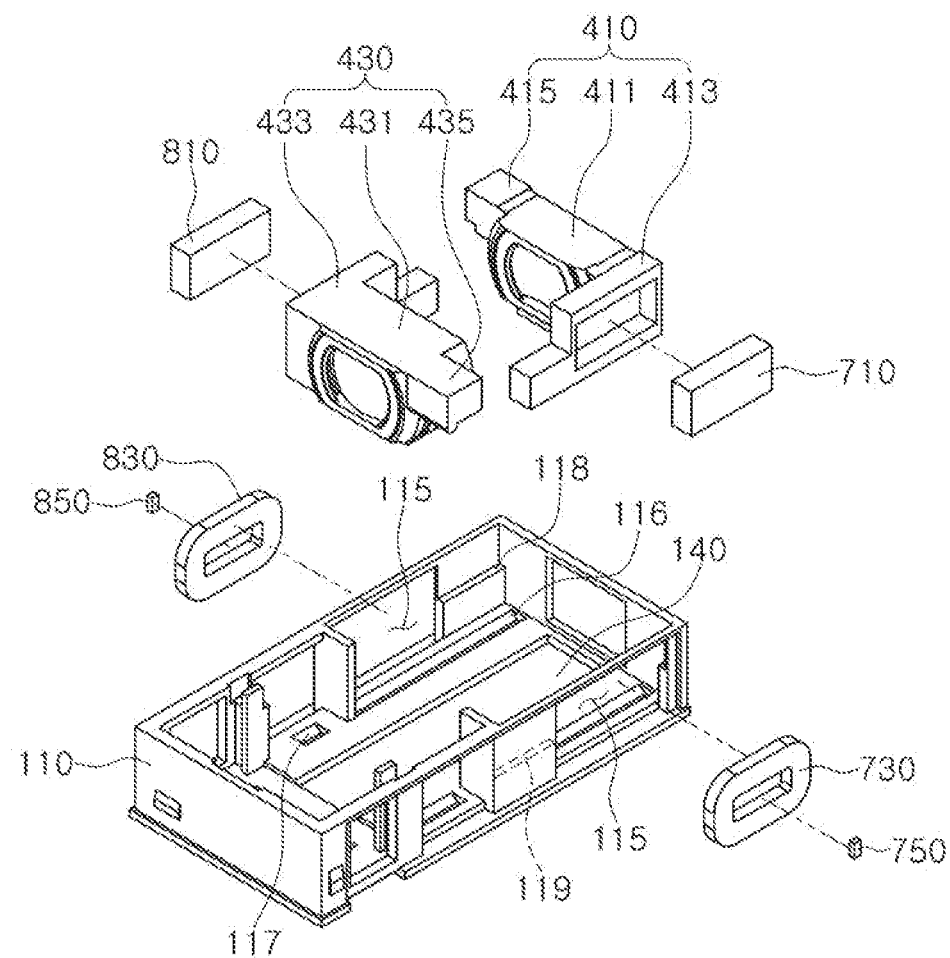
FIG. 9 illustrates an exploded perspective view of a housing, a first lens module, and a second lens module of an example camera module, in accordance with one or more embodiments.
Figure 10:
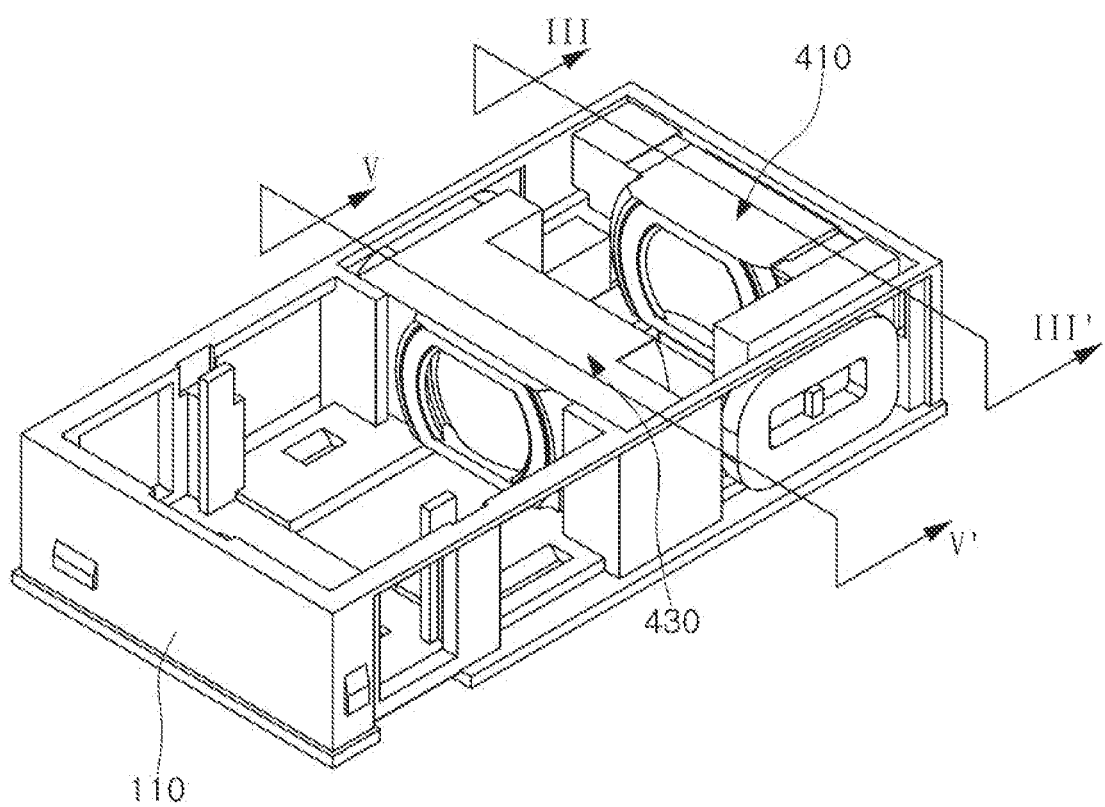
FIG. 10 illustrates a combined perspective view of a housing, a first lens module and a second lens module of an example camera module, in accordance with one or more embodiments.
Figure 11:
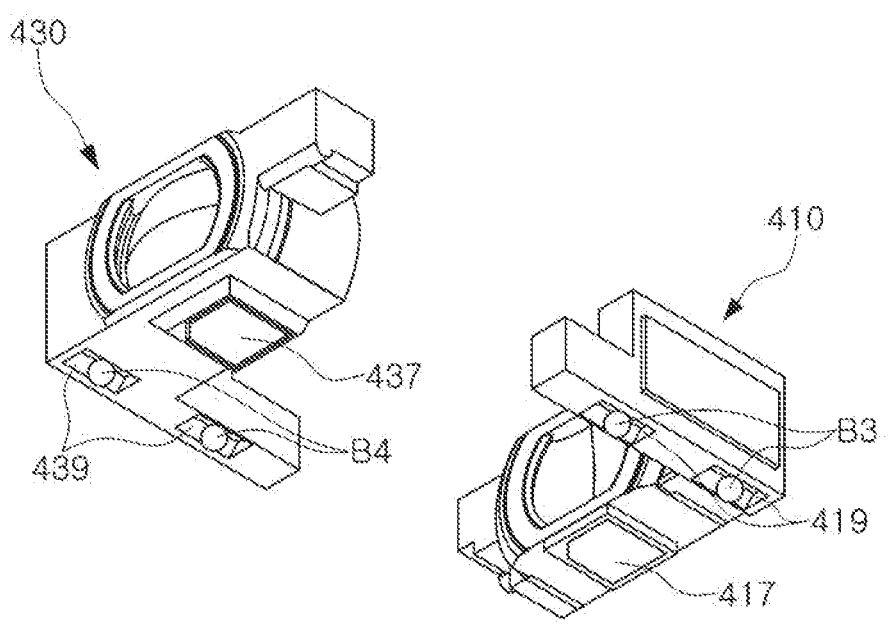
FIG. 11 illustrates a bottom perspective view of a first lens module and a second lens module of an example camera module, in accordance with one or more embodiments.

FIG. 9 is an exploded perspective view of a housing, a first lens module, and a second lens module of an example camera module, in accordance with one or more embodiments, FIG. 10 is a combined perspective view of a housing, a first lens module and a second lens module of an example camera module, in accordance with one or more embodiments and FIG. 11 is a perspective bottom view of a first lens module and a second lens module of an example camera module, in accordance with one or more embodiments.

Figure 12A:
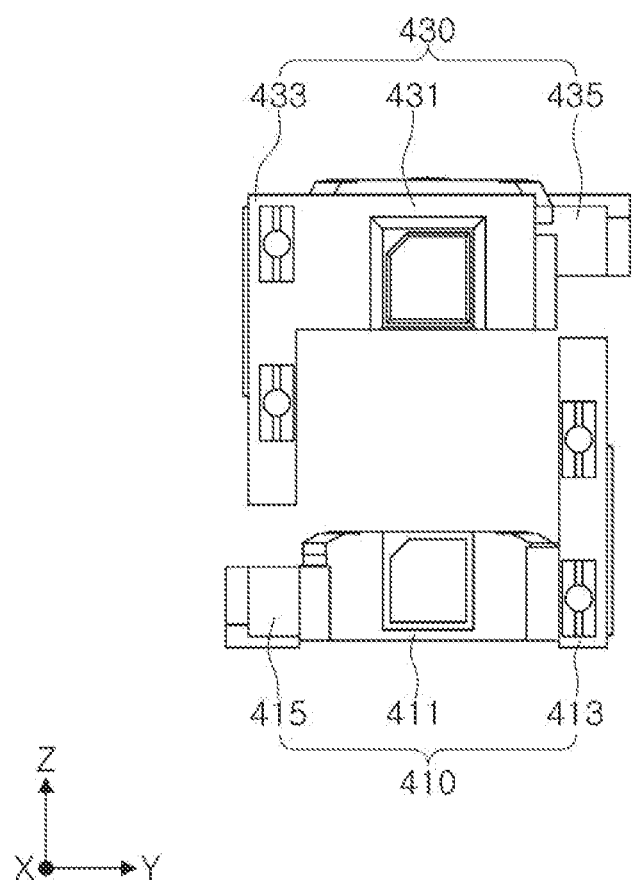
FIGS. 12A and 12B illustrate bottom views of an example first lens module and an example second lens module.
Figure 12B:
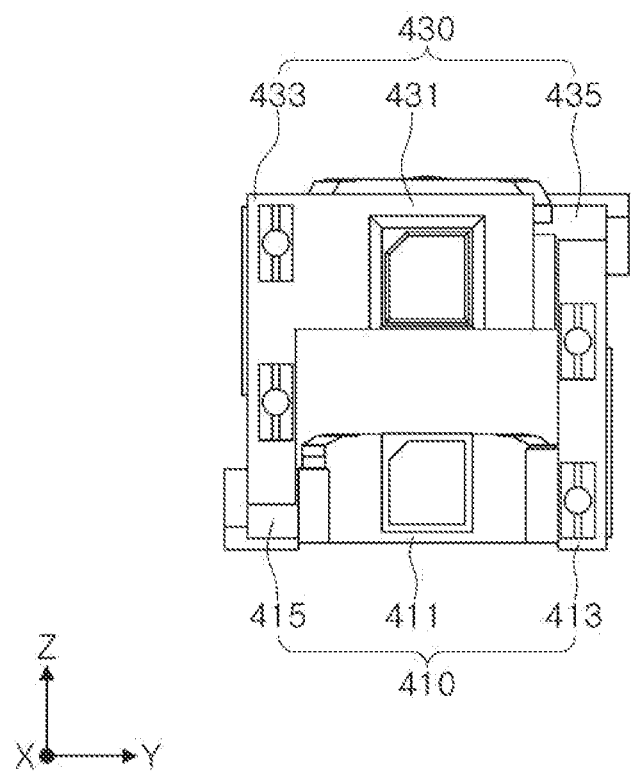
Figure 13A:
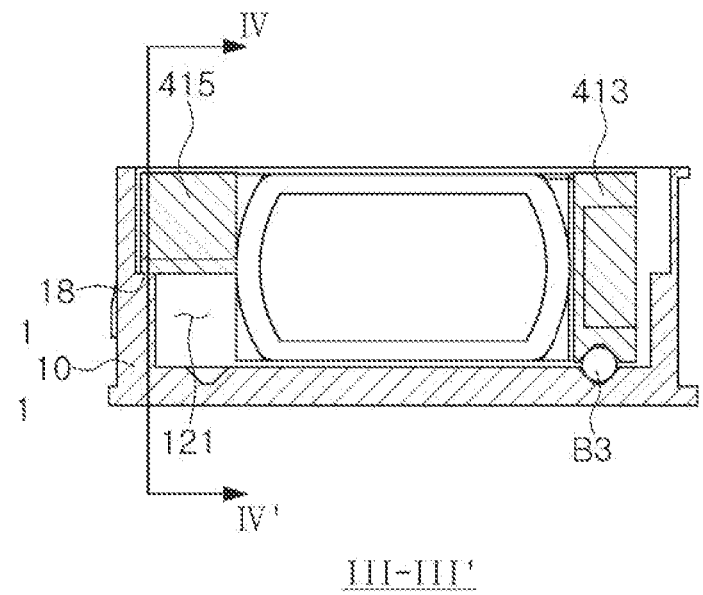
FIG. 13A is a cross-sectional view taken along line III-III' in FIG. 10.
Figure 13B:
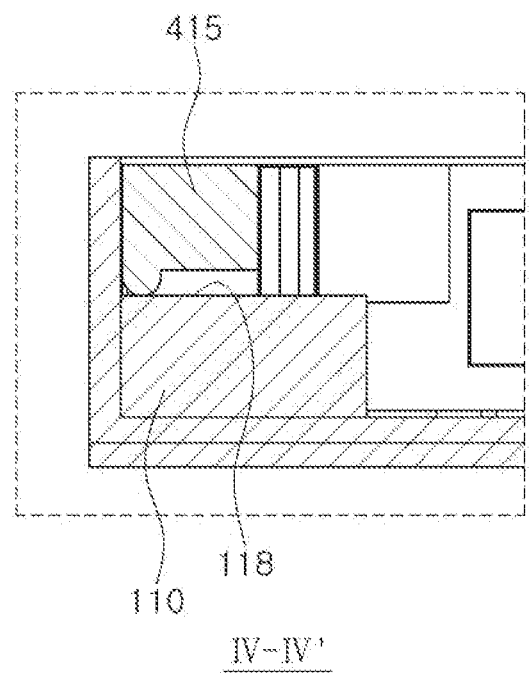
FIG. 13B is a cross-sectional view taken along line IV-IV' of FIG. 13A.

FIGS. 12A and 12B are bottom views of the first lens module and the second lens module, FIG. 13A is a cross-sectional view taken along line III-III' of FIG. 10, and FIG. 13B is a cross-sectional view taken along line IV-IV' of FIG. 13A.

Figure 14A:
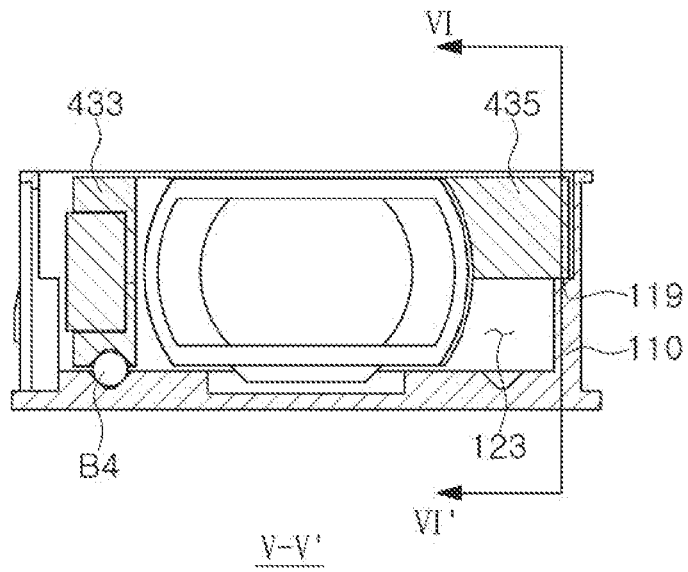
FIG. 14A is a cross-sectional view taken along line V-V' in FIG. 10.
Figure 14B:
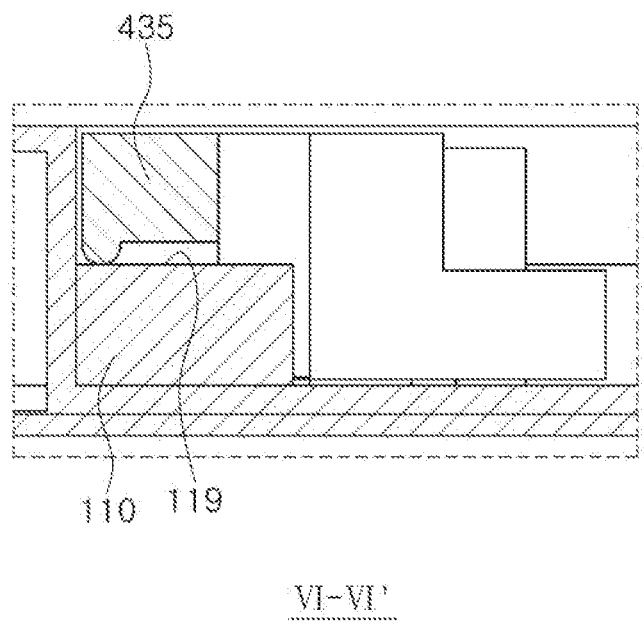
FIG. 14B is a cross-sectional view taken along line VI-VI' of FIG. 14A.

FIG. 14A is a cross-sectional view taken along line V-V' in FIG. 10, and FIG. 14B is a cross-sectional view taken along line VI-VI' in FIG. 14A.

First, referring to FIGS. 9 to 11, a first lens module 410 and a second lens module 430 are disposed in the housing 110. The first lens module 410 and the second lens module 430 may be respectively provided to be movable in the optical axis direction (the Z-axis direction). In an example, the first lens module 410 and the second lens module 430 are individually movable in the optical axis direction (the Z-axis direction).

Since one or both of the first lens module 410 and the second lens module 430 are moved, a relative distance between the first lens module 410 and the second lens module 430 may be varied, and thus, the zoom function may be implemented.

A third driving unit 700 may be provided to move the first lens module 410 in the optical axis direction (the Z-axis direction).

The third driving unit 700 includes a third magnet 710 and a third coil 730 and may be disposed on one side of the first lens module 410.

The third magnet 710 is mounted on the first lens module 410. For example, the third magnet 710 is disposed on one side of the first lens module 410.

The third coil 730 is disposed to face the third magnet 710 in a direction perpendicular to the optical axis direction (the Z-axis direction). In an example, the housing 110 is provided with a through-hole 115 in which the third coil 730 is disposed, and the third coil 730 is disposed in the through-hole 115 to face the third magnet 710 in the second axial direction (the Y-axis direction). The third coil 730 may be provided on the substrate 160 coupled to the housing 110.

The third magnet 710 and the third coil 730 generate driving force in a direction perpendicular to directions facing each other. In an example, the third magnet 710 and the third coil 730 generate driving force in the optical axis direction (the Z-axis direction).

Accordingly, the first lens module 410 may be moved in the optical axis direction (the Z-axis direction) by the driving force of the third magnet 710 and the third coil 730.

The camera module 1000, according to an example, uses a closed loop control method of sensing and feeding back the position of the first lens module 410.

Accordingly, a third position sensor 750 may be provided to sense the position of the first lens module 410.

The third position sensor 750 may be disposed in a hollow portion formed in the center of the third coil 730. In an example, the third position sensor 750 may be a hall sensor.

A third ball member B3 may be disposed between the first lens module 410 and the housing 110, and the first lens module 410 is guided in the optical axis direction (the Z-axis direction) by the third ball member B3. The third ball member B3 includes a plurality of ball members spaced apart in the optical axis direction (the Z-axis direction).

A first guide groove 419 is provided in a lower surface of the first lens module 410 (a surface facing the bottom surface of the housing 110). The first guide groove 419 includes a plurality of guide grooves spaced apart in the optical axis direction (the Z-axis direction), and has a shape in which each guide groove has a length in the optical axis direction (the Z-axis direction). In an example, the length of the first guide groove 419 in the optical axis direction (the Z-axis direction) may be greater than a diameter of the third ball member B3. Therefore, the third ball member B3 may be disposed to move in a rolling manner along the first guide groove 419.

A fourth guide groove 116 may be provided in the bottom surface of the housing 110. The fourth guide groove 116 may be formed long in the optical axis direction (the Z-axis direction).

The third ball member B3 may be disposed between the first guide groove 419 and the fourth guide groove 116, and may be disposed to roll along the first guide groove 419 and the fourth guide groove 116.

Accordingly, when a driving force is generated in the optical axis direction (the Z-axis direction), the first lens module 410 may be guided by the third ball member B3, and may move in the optical axis direction (the Z-axis direction).

A fourth driving unit 800 may be provided to move the second lens module 430 in the optical axis direction (the Z-axis direction).

The fourth driving unit 800 includes a fourth magnet 810 and a fourth coil 830, and may be disposed on the other side of the second lens module 430 (e.g., on the opposite side of one side of the second lens module 430).

The fourth magnet 810 may be mounted on the second lens module 430. In an example, the fourth magnet 810 may be disposed on a second side of the second lens module 430 (e.g., on the opposite side of a first side of the second lens module 430).

The fourth coil 830 may be disposed to face the fourth magnet 810 in a direction perpendicular to the optical axis direction (the Z-axis direction). In an example, the housing 110 is provided with a through-hole 115 in which the fourth coil 830 is disposed, and the fourth coil 830 is disposed in the through-hole 115 to face the fourth magnet 810 in the second axial direction (the Y-axis direction). The fourth coil 830 may be provided on the substrate 160 coupled to the housing 110.

The fourth magnet 810 and the fourth coil 830 generate driving forces in a direction perpendicular to directions facing each other. In an example, the fourth magnet 810 and the fourth coil 830 generate driving forces in the optical axis direction (the Z-axis direction).

Therefore, the second lens module 430 may be moved in the optical axis direction (the Z-axis direction) by the driving force of the fourth magnet 810 and the fourth coil 830.

The camera module 1000, according to an example, uses a closed loop control method of sensing and feeding back the position of the second lens module 430.

Therefore, a fourth position sensor 850 may be provided to sense the position of the second lens module 430.

The fourth position sensor 850 may be disposed in a hollow portion formed in the center of the fourth coil 830. In an example, the fourth position sensor 850 may be a hall sensor.

A fourth ball member B4 may be disposed between the second lens module 430 and the housing 110, and the second lens module 430 may be guided by the fourth ball member B4 to move in the optical axis direction (the Z-axis direction)). The fourth ball member B4 includes a plurality of ball members spaced apart in the optical axis direction (the Z-axis direction).

A second guide groove 439 is provided in a lower surface of the second lens module 430 (a surface facing the bottom surface of the housing 110). The second guide groove 439 includes a plurality of guide grooves spaced apart in the optical axis direction (the Z-axis direction), and has a shape in which each guide groove has a length in the optical axis direction (the Z-axis direction). In an example, the length of the second guide groove 439 in the optical axis direction (the Z-axis direction) is greater than a diameter of the fourth ball member B4. Therefore, the fourth ball member B4 is capable of rolling along the second guide groove 439.

The fourth ball member B4 may be disposed between the second guide groove 439 and the fourth guide groove 116, and may be disposed to roll along the second guide groove 439 and the fourth guide groove 116.

Therefore, in an example, when the driving force is generated in the optical axis direction (the Z-axis direction), the second lens module 430 may be guided by the fourth ball member B4 and may move in the optical axis direction (the Z-axis direction).

The first lens module 410 may be pressed toward the housing 110, such that a contact state of the third ball member B3 with the first lens module 410 and the housing 110 may be maintained. Additionally, the second lens module 430 may be pressed toward the housing 110, such that the contact of the fourth ball member B4 with the second lens module 430 and the housing 110 may be maintained.

Accordingly, the lower surface of the first lens module 410 and the lower surface of the second lens module 430 may be provided with pulling magnets 417 and 437, respectively, and the bottom surface of the housing 110 may be provided with a yoke member 140 facing the pulling magnets 417 and 437. The yoke member 140 may have a thin plate shape or may be a magnetic body.

Therefore, the pulling magnets 417 and 437 and the yoke member 140 generate attractive forces in the first axial direction (the X-axis direction), and thus, the first lens module 410 and the second lens module 430 may be pressed toward the housing 110.

The first lens module 410 may have a first side length and a second side length, which are different from each other. In an example, the first lens module 410 may have a form in which a length of a first side is greater than a length of a second side opposite to the first side. In this example, the length refers to the length in the optical axis direction (the Z-axis direction). In an example, the first lens module 410 has a shape, in which a first side and a second side are asymmetrical with respect to the optical axis.

The first lens module 410 includes a first body portion 411, a first extension portion 413 and a first support portion 415.

The first body portion 411 may be provided with at least one lens. The first extension portion 413 may extend from a first side of the first body portion 411 in the optical axis direction (the Z-axis direction), and the first support portion 415 may be provided on a second side of the first body portion 411.

The second lens module 430 may be formed to have different lengths on a first side and a second side. In an example, the second lens module 430 may be formed in such a manner that a length of a second side is greater than a length of a first side which is opposite to the second side. In this example, the length refers to the length in the optical axis direction (the Z-axis direction). In an example, the second lens module 430 has a shape, in which a first side and a second side are asymmetrical with respect to the optical axis.

The second lens module 430 may include a second body portion 431, a second extension portion 433, and a second support portion 435.

The second body portion 431 is provided with at least one lens. The second support portion 435 may be provided on a first side of the second body portion 431, and the second extension portion 433 extends in the optical axis direction (the Z-axis direction) from the second side of the second body portion 431.

The direction in which the first extension portion 413 of the first lens module 410 extends, and the direction in which the second extension portion 433 of the second lens module 430 extends, are opposite to each other. Accordingly, the first lens module 410 and the second lens module 430 may have shapes opposite to each other, based on the optical axis.

The first extension portion 413 of the first lens module 410 extends toward a first side of the second lens module 430, in an example, a side having a relatively shorter length in the optical axis direction (the Z-axis direction), and the second extension portion 433 of the second lens module 430 extends toward the second side of the first lens module 410, in an example, a side having a relatively shorter length in the optical axis direction (the Z-axis direction).

On the other hand, for miniaturization of the camera module, the size of the magnet may be difficult to reduce to secure a stable driving force even in the example in which the size of the body (e.g., the first and second body parts 411 and 431) in which the lens is provided in each lens module is reduced. Accordingly, it may be difficult to reduce the size of a portion in which the magnet is mounted in each lens module.

Since it may be difficult to reduce the size of the portion in which the magnet is mounted in each lens module, the first body portion 411 and the second body portion 431 may be farther away than necessary. Therefore, there is a problem in that miniaturizing the camera module may be difficult.

However, in this example, the first and second lens modules 410 and 430 have opposite shapes based on the optical axis direction (the Z-axis direction), and the direction in which the first extension portion 413 of the first lens module 410 extends and the direction in which the second extension portion 433 of the second lens module 430 extends are configured to be in opposite directions. Therefore, an interval between the first and second body portions 411 and 431 may be reduced. Therefore, the camera module 1000 may be miniaturized.

The first lens module 410 may be provided with a third magnet 710 that is provided on the first extension portion 413, and the second lens module 430 is provided with a fourth magnet 810 that is provided on the second extension portion 433.

Accordingly, since the third and fourth magnets 710 and 810 are disposed on relatively longer sides among sides of the first and second lens modules 410 and 430, the size of the third and fourth magnets 810 may be increased in a limited space. Therefore, even when the camera module 1000 is miniaturized, the magnitude of the driving force may be improved.

On the other hand, in the example in which both sides of the first lens module 410 and both sides of the second lens module 430 are supported by the ball member, since guide grooves for accommodating the ball members should be provided in both side portions of the first and second lens modules 430, there is a limit to reducing the size of the first and second lens modules 430.

Therefore, in the camera module 1000 according to an example of the present disclosure, portions of the first and second lens modules 410 and 430 in which the driving units are disposed are configured to be supported by a ball member, and portions of the first and second lens modules 410 and 430 in which the driving units are not disposed are configured to be supported by the housing. Therefore, the size of the first and second lens modules 410 and 430 may be reduced.

In an example, in the example of the first lens module 410, the first extension portion 413 on which the third magnet 710 is disposed may be supported by the third ball member B3, and the first support portion 415 on which the third magnet 710 is not disposed may be supported by the housing 110. In the example of the second lens module 430, the second extension portion 433 on which the fourth magnet 810 is disposed may be supported by the fourth ball member B4, and the second support portion 435 on which the fourth magnet 810 is not disposed may be supported by the housing 110.

When the first lens module 410 is moved, rolling friction occurs on one side of the first lens module 410 and sliding friction occurs on the other side thereof.

In an example, the first extension portion 413 may be supported by the third ball member B3, and the first support portion 415 may be supported by the housing 110.

In an example, the first guide groove 419 may be provided in the lower surface of the first extension portion 413, and the third ball member B3 may be provided between the lower surface of the first extension portion 413 and the bottom surface of the housing 110.

A first stepped portion 118 is provided on the inner surface of the housing 110, and the first support portion 415 is contacted and supported by the first stepped portion 118. The first support portion 415 and the first stepped portion 118 may be contacted in the first axial direction (the X-axis direction).

In this example, the first support portion 415 and the first stepped portion 118 may be in line contact. In an example, one of the first support portion 415 and the first stepped portion 118 may include a curved surface (see FIG. 13B). Therefore, frictional force generated between the first support portion 415 and the first stepped portion 118 may be significantly reduced.

When the second lens module 430 is moved, sliding friction occurs on a first side of the second lens module 430, and rolling friction occurs on a second side thereof.

In an example, the second extension portion 433 may be supported by the fourth ball member B4, and the second support portion 435 may be supported by the housing 110.

In an example, the second guide groove 439 is provided in the lower surface of the second extension portion 433, and the fourth ball member B4 is provided between the lower surface of the second extension portion 433 and the bottom surface of the housing 110.

A second stepped portion 119 is provided on the inner surface of the housing 110, and the second support portion 435 is contacted and supported by the second stepped portion 119. The second support portion 435 and the second stepped portion 119 may be contacted in the first axial direction (the X-axis direction).

In this example, the second support portion 435 and the second stepped portion 119 may be in line contact. In an example, one of the second support portion 435 and the second stepped portion 119 may include a curved surface (see FIG. 14B). Accordingly, frictional force generated between the second support portion 435 and the second stepped portion 119 may be significantly reduced.

On the other hand, in the camera module 1000, according to an example, one or both of the first lens module 410 and the second lens module 430 may be moved in the optical axis direction (the Z-axis direction) to implement a zoom function. In this example, to implement the zoom function, it is necessary to sufficiently secure the moving spaces of the first lens module 410 and the second lens module 430, and accordingly, there may be a problem that it may be difficult to reduce the size of the camera module.

In this example, in the camera module 1000, according to an example of the present disclosure, the first lens module 410 and the second lens module 430 move to overlap in a direction (e.g., the first axial direction (the X-axis direction)) perpendicular to the optical axis direction (the Z-axis direction), thereby sufficiently securing the moving space of the first lens module 410 and the second lens module 430, while reducing the size of the camera module 1000.

A first accommodation space 121 may be provided between the first lens module 410 and the housing 110 (see FIG. 13A). In an example, the first accommodation space 121 may be provided between the lower surface of the first support portion 415 and the bottom surface of the housing 110.

A second accommodating space 123 is provided between the second lens module 430 and the housing 110 (see FIG. 14A). In an example, the second accommodation space 123 may be provided between the lower surface of the second support portion 435 and the bottom surface of the housing 110.

When either or both of the first lens module 410 and the second lens module 430 are moved in the optical axis direction (the Z-axis direction), the first extension portion 413 of the first lens module 410 may be disposed in the second accommodation space 123, and the second extension portion 433 of the second lens module 430 may be disposed in the first accommodation space 121.

Accordingly, when either or both of the first lens module 410 and the second lens module 430 are moved in the optical axis direction (the Z-axis direction), the first lens module 410 and the second lens module 430 may overlap in a direction (e.g., the first axial direction (the X-axis direction)) perpendicular to the optical axis direction (the Z-axis direction).

Therefore, while reducing the size of the camera module 1000, the moving space of the first lens module 410 and the second lens module 430 may be sufficiently secured.

On the other hand, referring to FIG. 4, the camera module 1000 according to an example may further include a third lens module 450.

The third lens module 450 may be disposed in the inner space of the housing 110 between the first protruding wall 111 and the second protruding wall 112.

The third lens module 450 is provided to be movable in the optical axis direction (the Z-axis direction).

A fifth driving unit 900 may be provided to move the third lens module 450 in the optical axis direction (the Z-axis direction).

The fifth driving unit 900 includes a fifth magnet 910 and a fifth coil 930.

The fifth magnet 910 is mounted on the third lens module 450. For example, the fifth magnet 910 is disposed on a side of the third lens module 450.

The fifth coil 930 is disposed to face the fifth magnet 910 in a direction perpendicular to the optical axis direction (the Z-axis direction). In an example, the housing 110 is provided with a through-hole 114 in which the fifth coil 930 is disposed, and the fifth coil 930 is disposed in the through-hole 114 to face the fifth magnet 910 in the second axial direction (the Y-axis direction). The fifth coil 930 may be provided on the substrate 160 coupled to the housing 110.

The fifth magnet 910 may include a plurality of magnets disposed on both sides of the third lens module 450, and the fifth coil 930 may include a plurality of coils to correspond to the fifth magnet 910.

The fifth magnet 910 and the fifth coil 930 generate driving forces in a direction perpendicular to directions facing each other. In an example, the fifth magnet 910 and the fifth coil 930 generate driving forces in the optical axis direction (the Z-axis direction).

Accordingly, the third lens module 450 may be moved in the optical axis direction (the Z-axis direction) by the driving force of the fifth magnet 910 and the fifth coil 930.

The camera module 1000 according to an example uses a closed loop control method of sensing and feedbacking the position of the third lens module 450.

Accordingly, a fifth position sensor 950 is provided to sense the position of the third lens module 450.

The fifth position sensor 950 may be disposed in a hollow portion formed in the center of the fifth coil 930. In an example, the fifth position sensor 950 may be a hall sensor.

A fifth ball member B5 may be disposed between the third lens module 450 and the housing 110, and the third lens module 450 is guided by the fifth ball member B5 to move in the optical axis direction (the Z-axis direction). The fifth ball member B5 includes a plurality of ball members. A first side of the third lens module 450 may be supported by a plurality of ball members spaced apart from each other in the optical axis direction (the Z-axis direction), and a second side of the third lens module 450 may be supported by at least one ball member.

A third guide groove may be provided in a lower surface of the third lens module 450 (a surface facing the bottom surface of the housing 110). The third guide groove includes a plurality of guide grooves provided in positions corresponding to the fifth ball member B5, and each guide groove is shaped to have a length in the optical axis direction (the Z-axis direction). In an example, the length of the third guide groove in the optical axis direction (the Z-axis direction) may be greater than a diameter of the fifth ball member B5. Therefore, the fifth ball member B5 is disposed to roll along the third guide groove.

A fifth guide groove 117 may be provided in a position corresponding to the third guide groove 453 on the bottom surface of the housing 110. The fifth guide groove 117 may have a shape having a length in the optical axis direction (the Z-axis direction). In an example, the length of the fifth guide groove 117 in the optical axis direction (the Z-axis direction) may be greater than the diameter of the fifth ball member B5. Therefore, the fifth ball member B5 may be disposed to roll along the fifth guide groove 117.

The fifth ball member B5 may be disposed between the third guide groove and the fifth guide groove 117, and may be disposed to roll along the third guide groove and the fifth guide groove 117.

Accordingly, when a driving force is generated in the optical axis direction (the Z-axis direction), the third lens module 450 may be guided by the fifth ball member B5 and may move in the optical axis direction (the Z-axis direction).

The third lens module 450 is pressed toward the housing 110, such that a contact state of the fifth ball member B5 with the third lens module 450 and the housing 110 may be maintained.

Accordingly, a pulling magnet facing the yoke member 140 provided on the bottom surface of the housing 110 may be provided on the lower surface of the third lens module 450.

Therefore, the pulling magnet and the yoke member 140 generate an attractive force in the first axial direction (the X-axis direction), and accordingly, the third lens module 450 may be pressed toward the housing 110.

As set forth above, according to examples, the size of the camera module may be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a housing; and
a first lens module and a second lens module disposed in the housing, and individually movable in an optical axis direction,
wherein the first lens module is configured to generate rolling friction on a first side of two sides of the first lens module, and generate sliding friction on a second side of the two sides of the first lens module when the first lens module is moved, where the sliding friction is generated by an interaction of the second side of the first lens module with a first stepped portion provided on an inner side of the housing, and
wherein the second lens module is configured to generate rolling friction on a first side of two sides of the second lens module, and generate sliding friction on a second side of the two sides of the second lens module when the second lens module is moved.

2. The camera module of claim 1, wherein the first side and the second side of each of the first lens module and the second lens module are configured to have different lengths in the optical axis direction.

3. The camera module of claim 2, wherein the respective first sides of the first lens module and the second lens module are supported by ball members, and the respective second sides of the first lens module and the second lens module are supported by the housing.

4. The camera module of claim 3, wherein the second sides and the housing are in contact with each other, and
wherein at least one of the second sides and the housing has a curved surface in a portion where the second side is in contact with the housing.

5. The camera module of claim 2, wherein the first side of the first lens module is movable to be disposed in a space between the second side of the second lens module in the optical axis direction and a bottom surface of the housing.

6. The camera module of claim 2, wherein the second side of the second lens module is movable to be disposed in a space between the second side of the first lens module in the optical axis direction and a bottom surface of the housing.

7. The camera module of claim 1, wherein the first lens module comprises a first body portion provided with a lens, a first extension portion that extends from a first side of the first body portion in the optical axis direction, and a first support portion provided on a second side of the first body portion,
the second lens module comprises a second body portion provided with a lens, a second support portion provided on a first side of the second body portion, and a second extension portion that extends from a second side of the second body portion in the optical axis direction,
the first extension portion of the first lens module is configured to have a length in the optical axis direction that is greater than the first support portion, and
the second extension portion of the second lens module is configured to have a length in the optical axis direction that is greater than the second support portion.

8. The camera module of claim 7, wherein a first ball member is disposed between the first extension portion of the first lens module and a bottom surface of the housing, and a portion of the first support portion is contacted and supported by the housing, and
a second ball member is disposed between the second extension portion and the bottom surface of the housing, and a portion of the second support portion is contacted and supported by the housing.

9. The camera module of claim 8, wherein the inner surface of the housing is provided with the first stepped portion in contact with the first support portion, and a second stepped portion in contact with the second support portion.

10. The camera module of claim 8, wherein the portion of the first support portion and the portion of the second support portion, contacting the housing, each comprise a curved surface.

11. The camera module of claim 7, wherein the first support portion and a bottom surface of the housing are provided with a first accommodation space therebetween, and the second support portion and the bottom surface of the housing are provided with a second accommodation space therebetween.

12. The camera module of claim 11, wherein the first lens module is movable such that the first extension portion is disposed in the second accommodation space, and
the second lens module is movable such that the second extension portion is disposed in the first accommodation space.

13. The camera module of claim 7, wherein the first extension portion is provided with a first magnet disposed thereon, and a first coil is disposed to face the first magnet, and
the second extension portion is provided with a second magnet disposed thereon, and a second coil is disposed to face the second magnet.

14. The camera module of claim 1, wherein the housing is provided with a reflection module disposed therein, and the reflection module is configured to change a path of light such that light is directed to the first and second lens modules.

15. The camera module of claim 14, wherein the reflection module is configured to be rotatable about two axes, perpendicular to the optical axis direction and perpendicular to each other.

16. A camera module, comprising:
a housing;
a first lens module, having a first extension portion disposed on a first side, and a first support portion disposed on a second side, a length of the first extension portion being different from a length of the first support portion; and
a second lens module, having a second extension portion disposed on a first side, and a second support portion disposed on a second side, a length of the second extension portion being different from a length of the second support portion;
wherein the first lens module and the second lens module are configured to move in an optical axis direction, and are configured to overlap in a direction perpendicular to the optical axis direction,
wherein the first extension portion and the second support portion are configured to overlap when the first lens module and the second lens module are adjacent to each other in the optical axis direction, and
wherein the second extension portion and the first support portion are configured to overlap when the first lens module and the second lens module are adjacent to each other in the optical axis direction.

17. The camera module of claim 16, wherein the first extension portion and the second extension portion are configured to extend in the optical axis direction.

18. The camera module of claim 16, wherein a direction in which the first extension portion extends, and a direction in which the second extension portion extends are opposite to each other.

* * * * *